United States Patent [19]

Koji et al.

[11] Patent Number: 5,536,548
[45] Date of Patent: Jul. 16, 1996

[54] OPTICAL RECORDING DISK

[75] Inventors: Yasukawa Koji; Toshiki Aoi; Hiroyuki Arioka, all of Nagano, Japan

[73] Assignee: TDK Corporation, Tokyo, Japan

[21] Appl. No.: 406,410

[22] Filed: Mar. 20, 1995

[30] Foreign Application Priority Data

Mar. 31, 1994 [JP] Japan .................................. 6-087864

[51] Int. Cl.⁶ ..................................................... B32B 3/00
[52] U.S. Cl. ..................... 428/64.1; 428/64.2; 428/64.4; 428/64.8; 428/913; 430/270.16; 430/495.1; 430/945; 369/283; 369/288
[58] Field of Search ................................ 428/64.1, 64.2, 428/64.4, 64.8, 913; 430/270, 495, 945; 369/283, 288

[56] References Cited

U.S. PATENT DOCUMENTS

| 5,154,958 | 10/1992 | Namba ...................... 428/64.1 |
| 5,313,452 | 5/1994 | Usami ...................... 369/275.1 |
| 5,328,741 | 7/1994 | Yanagisawa ................ 428/64.1 |
| 5,389,419 | 2/1995 | Maeda ...................... 428/64.1 |
| 5,449,587 | 9/1995 | Itoh ........................ 430/273 |

FOREIGN PATENT DOCUMENTS 05-255339  10/1993  Japan .

*Primary Examiner*—Patrick J. Ryan
*Assistant Examiner*—Elizabeth Evans
*Attorney, Agent, or Firm*—Watson Cole Grindle & Watson

[57] ABSTRACT

In an optical recording disk comprising a reflective layer in close contact with a recording layer, the recording layer contains a phthalocyanine dye and a second dye having a lower heat decomposition temperature than the phthalocyanine dye. By virtue of a depression of heat decomposition temperature, recording sensitivity is improved.

6 Claims, 1 Drawing Sheet

1

OPTICAL RECORDING DISK

BACKGROUND OF THE INVENTION

1. Field of the Invention

This invention relates to an optical recording disk having a dye film as a recording layer, and more particularly, to an optical recording disk of the write-once type using a phthalocyanine dye.

2. Prior Art

Optical recording disks of the write-once, rewritable and other types have been of great interest as high capacity information carrying media. Some optical recording disks use a dye film as the recording layer. From a structural aspect, commonly used optical recording disks are classified into the air-sandwich structure having an air space on a dye base recording layer and the close contact type having a reflective layer in close contact with a dye base recording layer. The latter has the advantage that they can be reproduced in accordance with the compact disk (CD) standard. In this regard, reference is made to Nikkei Electronics, Jan. 23, 1989, No. 465, page 107; the Functional Dye Department of the Kinki Chemical Society, Mar. 3, 1989, Osaka Science & Technology Center; and Proceedings SPIE—The International Society for Optical Engineering, Vol. 1078, pages 80–87, "Optical Data Storage Topical Meeting", 17–19, January 1989, Los Angels.

In the close contact structure having a reflective layer in close contact with a recording layer, the substrate is formed with a spiral groove at a pitch of about 1.6 µm for tracking. The region of the recording layer in the groove serves as a recording track.

Among the dyes used in the recording layer, cyanine dyes were predominant in the prior art. However, the cyanine dyes are generally less resistant to light and insufficiently reliable on recording. Attempts are thus made to use phthalocyanine dyes instead. The phthalocyanine dyes, however, have the problem of low recording sensitivity when used in the recording layer because they are generally thermally stable.

One solution is proposed by Japanese Patent Application Kokai (JP-A) No. 255339/1993 which discloses the use of a nitrosilicon phthalocyanine having —OP(=O)($R^1$)($R^2$) ligands coordinated above and below a center atom Si wherein $R^1$ and $R^2$ are alkyl, aryl, alkoxyl or aryloxy groups. In order to provide high recording sensitivity, a nitrosilicon phthalocyanine compound of a specific structure having a selected type of substituent must be used. Some compounds are not commercially available and must be synthesized through a process which is cumbersome to the disk manufacturers. Even if synthesis is possible, some compounds are difficult to synthesize or low in yield.

It is also contemplated to increase recording sensitivity by modifying the shape of a groove in the substrate. Actually attempting such shape modification, we found that the problem could not be solved when phthalocyanine dyes were used as the recording layer.

Therefore, it is desired to find a simple means for improving the recording sensitivity of an optical recording disk using a phthalocyanine dye in the recording layer.

SUMMARY OF THE INVENTION

A primary object of the present invention is to provide an optical recording disk using a stable phthalocyanine dye in the recording layer and affording an improved recording sensitivity.

2

Quite unexpectedly, we have found that when a phthalocyanine dye having a heat decomposition temperature $Td_1$ is mixed with a second dye having a heat decomposition temperature $Td_2$ which is lower than $Td_1$, a depression of heat decomposition temperature occurs, that is, the resulting dye mixture has a heat decomposition temperature which is lower than $Td_1$ and often lower than $Td_2$.

According to the invention, there is provided an optical recording disk comprising a substrate having a groove for tracking, a dye-containing recording layer on the substrate, and a reflective layer on the recording layer, wherein recording light is directed to the recording layer in the groove to form a recorded spot. The recording layer containing at least one phthalocyanine dye and at least one second dye having a lower heat decomposition temperature than said phthalocyanine dye. The second dye is preferably a phthalocyanine dye, an indolenine-cyanine dye or a metal complex dye, with the indolenine-cyanine dye being especially preferred. The phthalocyanine dye and the second dye are preferably mixed in a weight ratio of from 85:15 to 25:75. In one preferred embodiment, the groove has a depth of 800 to 1,700 Å and a width of 0.3 to 0.6 µm and the recording layer in the groove has a thickness of 1,500 to 2,500 Å.

BRIEF DESCRIPTION OF THE DRAWINGS

The only FIGURE.

DETAILED DESCRIPTION OF THE INVENTION

Figure 1:
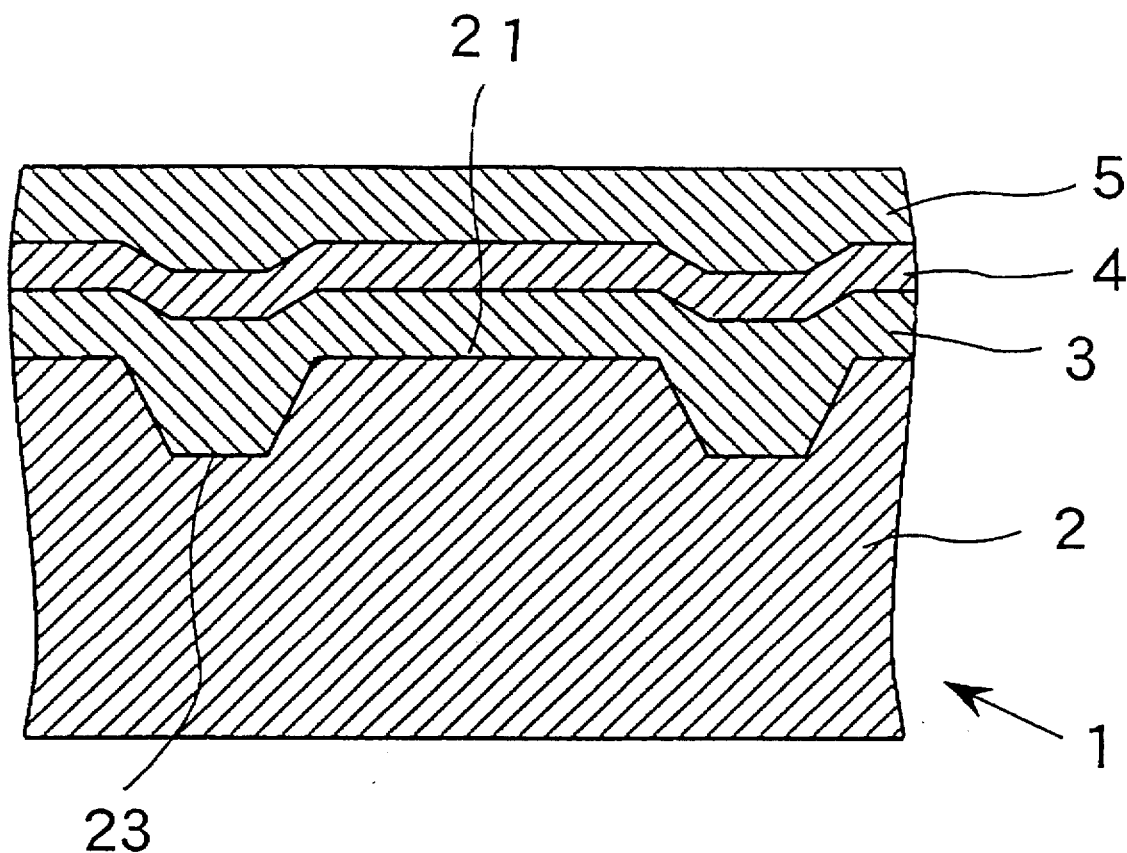
FIG. 1 is a schematic cross-sectional view of a portion of an optical recording disk according to the present invention.

The optical recording disk of the present invention has a recording layer which contains at least one phthalocyanine dye and at least one second dye having a lower heat decomposition temperature than the phthalocyanine dye. For brevity's sake, the first phthalocyanine dye is often referred to as phthalocyanine dye A and the second dye is referred to as dye B, hereinafter. Although a thermally stable phthalocyanine dye (dye A) has a high heat decomposition temperature when used alone, a mixture of dyes A and B combined has a lower heat decomposition temperature. That is, mixing of two dyes A and B brings out a depression of heat decomposition temperature. Consequently, recording sensitivity is improved and recording can be done with a lower power. More particularly, recording sensitivity is improved to a level comparable to or greater than the recording sensitivity available with the conventional indolenine-cyanine dyes. This allows phthalocyanine dyes to exert their advantage that they are significantly stable in terms of light resistance and the like. The optimum recording power can be reduced by about 20 to 40% as compared with the sole use of a phthalocyanine dye.

JP-A 255339/1993 discloses the use of at least one nitro group-containing silicon phthalocyanine compound of a specific structure in the recording layer. However, only one is used in Examples and no discussion is made as to the use of a mixture of phthalocyanine compounds. The heat decomposition temperature of dyes is referred to nowhere. This patent reference is different in construction from the present invention.

The recording layer of a specific dye combination in the disk according to the invention has a heat decomposition temperature which is lower than that of a recording layer consisting solely of a phthalocyanine dye and generally ranges from about 240° C. to about 300° C.

More particularly, phthalocyanine dye A used herein has a heat decomposition temperature $Td_1$ of about 410° to 430° C. One phthalocyanine dye is normally used although a plurality of phthalocyanine dyes having an identical heat decomposition temperature may be used as dye A. The second dye to be combined with phthalocyanine dye A and having a lower heat decomposition temperature than phthalocyanine dye A, that is, dye B has a heat decomposition temperature $Td_2$ ($Td_2<Td_1$) of preferably about 120° to 300° C. Dye B is preferably selected from the group consisting of a phthalocyanine dye, an indolenine-cyanine dye, and a metal complex dye. Better results are obtained by using an indolenine-cyanine dye as dye B when the solubility of a dye in an organic solvent as a coating medium is taken into account. One dye is normally used although a plurality of dyes may be used as dye B.

It is noted that the phthalocyanine dyes used herein include naphthalocyanine dyes as well as phthalocyanine dyes.

Preferably, the difference in heat decomposition temperature between phthalocyanine dye A and dye B, that is, ($Td_1-Td_2$) is about 100° to 300° C.

The recording layer preferably contains phthalocyanine dye A and dye B in a weight ratio of from 85:15 to 25:75, more preferably from 75:25 to 25:75, further preferably from 70:30 to 30:70, most preferably from 60:40 to 40:60. Blending ratios within this range ensure a sufficient depression of heat decomposition temperature to achieve the benefits of the invention. Higher contents of phthalocyanine dye A exceeding the range would fail to provide a sufficient depression of heat decomposition temperature. Inversely, higher contents of dye B exceeding the range would tend to somewhat raise the heat decomposition temperature, also failing to achieve the benefits of the invention. Additionally where dye B is a dye other than the phthalocyanine dye, for example, an indolenine-cyanine dye, a dye mixture as a whole would not take full advantage of the characteristics, for example, light resistance of the phthalocyanine dye as dye A.

Preferably the recording layer is formed solely of dyes although it may contain another component such as a resin binder.

The heat decomposition temperature is the temperature at which a dye or recording layer is decomposed by heat and can be determined by thermal analysis such as thermogravimetric analysis (TG), differential thermal analysis (DTA) and differential scanning calorimetric analysis (DSC). The heat decomposition temperature of a recording layer is defined as the heat decomposition temperature of a dye mixture of the same composition as the recording layer. Measurement of a heat decomposition temperature is carried out in an inert gas atmosphere such as argon in order to eliminate the influence of oxygen in air.

Preferably phthalocyanine dye A used herein is selected from phthalocyanine dyes of the following general formula (1).

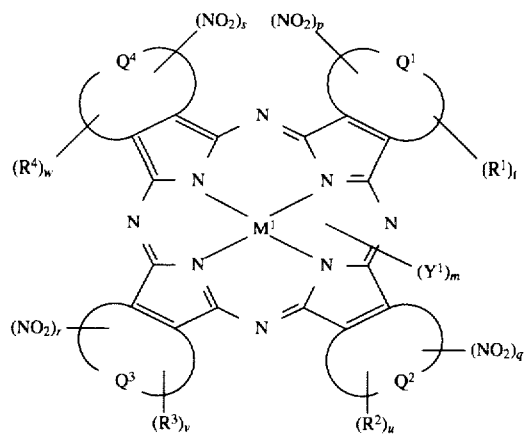

In formula (1), each of $Q^1$, $Q^2$, $Q^3$, and $Q^4$ is a group of atoms necessary to complete a benzene ring or naphthalene ring; each of $R^1$, $R^2$, $R^3$, and $R^4$ is a monovalent substituent; $M^1$ is a center atom; $Y^1$ is a ligand which can coordinate with the center atom; letters p, q, r, and s each are 0, 1 or 2; letters t, u, v, and w each are 0, 1 or 2; and letter m is 0, 1 or 2.

The condensed ring represented by $Q^1$, $Q^2$, $Q^3$, and $Q^4$ as being condensed to the pyrrole ring is preferably a benzene ring.

Included in the monovalent substituents represented by $R^1$, $R^2$, $R^3$, and $R^4$ are halogen atoms such as chlorine, bromine, iodine and fluorine atoms; substituted or unsubstituted alkyl groups such as methyl, ethyl, hexyl, dodecyl, isopropyl, 2-ethylhexyl, t-butyl, neopentyl, trichloromethyl, 1,2-dichloroethyl, trifluoromethyl, pentafluoroethyl, 1,1,2,2-tetrafluoroethyl, heptafluoropropyl, and 2,2,3,3-tetrafluoropropyl groups; substituted or unsubstituted aryl groups such as phenyl, naphthyl, 3-methylphenyl, 3-methoxyphenyl, 3-fluorophenyl, 3-trichloromethylphenyl, 3-trifluoromethylphenyl, pentafluorophenyl, and 3-nitrophenyl groups; substituted or unsubstituted alkoxy groups such as methoxy, ethoxy, n-butoxy, tert-butoxy, 2-ethylhexyloxy, neopentoxy, 2,2,2-trichloroethoxy, 2,2,2-trifluoroethoxy, 2,2,3,3-tetrafluoropropoxy, 2,2,3,3,3-pentafluoropropoxy, 1,1,1,3,3,3-hexafluoro-2-propoxy, 2,2,3,4,4,4-hexafluorobutoxy, 1H,1H,5H-octafluoropentoxy, 1H,1H,7H-dodecafluoroheptoxy, 1H,1H,9H-hexadecafluorononyloxy, 2-(perfluorohexyl)ethoxy, 2-(perfluorooctyl)ethoxy, 2-(perfluorodecyl)ethoxy, 2-(perfluoro-3-methylbutyl)ethoxy, 6-(perfluoroethyl)hexyloxy, and 6-(perfluorohexyl)hexyloxy groups; substituted or unsubstituted aryloxy groups such as phenoxy, p-nitrophenoxy, p-tert-butylphenoxy, 3-fluorophenoxy, pentafluorophenoxy, and 3-trifluoromethylphenoxy groups; substituted or unsubstituted alkylthio groups such as methylthio, ethylthio, tert-butylthio, hexylthio, octylthio, and trifluoromethylthio groups; and substituted or unsubstituted arylthio groups such as phenylthio, p-nitrophenylthio, p-tert-butylphenylthio, 3-fluorophenylthio, pentafluorophenylthio, and 3-trifluorophenylthio groups. Preferred substituents are alkyl and alkoxy groups. Among the alkyl groups, substituted alkyl groups having 1 to 12 carbon atoms are preferred which may be normal or branched. Substituents on the alkyl groups are preferably halogen atoms such as fluorine. Among the alkoxy groups, substituted alkoxy groups having 1 to 12 carbon atoms are preferred while their alkyl moiety may be normal or branched. Substituents on the alkoxy groups are preferably halogen atoms such as fluorine. $R^1$ to $R^4$ are identical in most cases although they may be different if desired.

Included in the center atoms represented by $M^1$ are hydrogen atoms (2H) and metal atoms. Examples of the metal atom are metal atoms belonging to Groups 1 to 14 of the Periodic Table (Groups 1A to 7A, 8, and 1B to 4B), such as Li, Na, K, Mg, Ca, Ba, Ti, Zr, V, Nb, Ta, Cr, Mo, W, Mn, Tc, Fe, Co, Ni, Ru, Rh, Pd, Os, Ir, Pt, Cu, Ag, Au, Zn, Cd, Hg, Al, In, Tl, Si, Ge, Sn, and Pb. Preferred among these are Li, Ti, V, Cr, Mn, Fe, Co, Ni, Cu, Zn, Al, and Si, with Si being most preferred.

The ligand represented by $Y^1$ includes hydrogen, oxygen, halogen, hydroxyl, alkyl, alkoxy, acyloxy, and a group represented by the following formula (2):

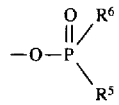

wherein each of $R^5$ and $R^6$, which may be identical or different, is an alkyl, aryl, alkoxy or aryloxy group.

It is understood that examples of the halogen atom, alkyl and alkoxy groups represented by $Y^1$ and the alkyl, aryl, alkoxy and aryloxy groups represented by $R^5$ and $R^6$ are the same as exemplified for $R^1$ to $R^4$. Examples of the acyloxy group represented by $Y^1$ are acetoxy and propionyloxy groups.

The preferred ligand represented by $Y^1$ is a group of formula (2) wherein each of $R^5$ and $R^6$ is typically a substituted or unsubstituted alkyl group having 1 to 6 carbon atoms or an aryl group such as phenyl.

More preferred among the compounds of formula (1) are compounds of the following general formula (3).

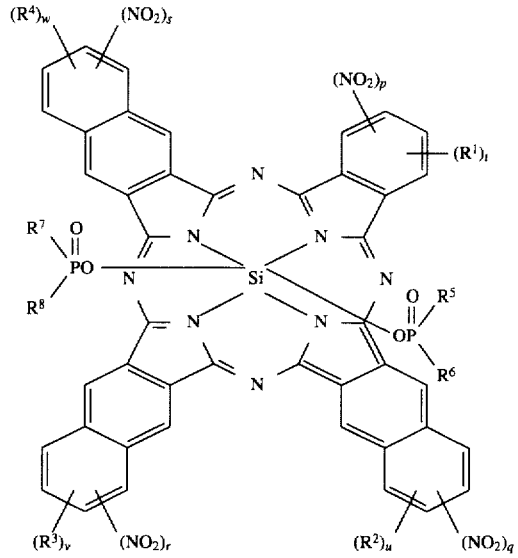

In formula (3), $R^1$, $R^2$, $R^3$, $R^4$, p, q, r, s, t, u, v and w are the same as defined in formula (1), with preferred examples being the same. $R^5$ and $R^6$ are the same as defined in formula (2), with preferred examples being the same. In formula (3), $R^5$ groups or $R^6$ groups or $R^5$ and $R^6$ groups are identical in most cases while they may be different if desired.

Specific examples of the compound of formula (3) are shown in Table 1 as combinations of $R^1$ to $R^6$ and p to w.

TABLE 1

| Compound No. | $R^1$ (= $R^2$ = $R^3$ = $R^4$) | $R^5$ (= $R^6$) | p (= q = r = s) | t (= u = v = w) |
|---|---|---|---|---|
| 3-1 | —CF$_2$CF$_3$ | —Ph | 1 | 1 |
| 3-2 | —CF$_2$CF$_3$ | —Ph | 0 | 1 |
| 3-3 | —OCH$_2$CF$_3$ | —C$_4$H$_9$ | 1 | 1 |
| 3-4 | —CF$_2$CHF$_2$ | —Ph | 1 | 1 |
| 3-5 | —OCH$_2$CF$_3$ | —Ph | 1 | 1 |
| 3-6 | —OCF$_2$CF$_3$ | —C$_4$H$_9$ | 1 | 1 |

(Ph is phenyl)

It is understood that the phthalocyanine compounds of formula (1) can be synthesized by a well-known process. Nitro-substituted ones may be synthesized by nitrating a corresponding well-known nitro-free phthalocyanine compound in an aprotic solvent with a nitrating agent as described in JP-A 255339/1993. Several phthalocyanine compounds are commercially available in a state ready for use.

Dye B having a lower heat decomposition temperature than phthalocyanine dye A is preferably an indoleninecyanine dye, especially of the following general formula (4).

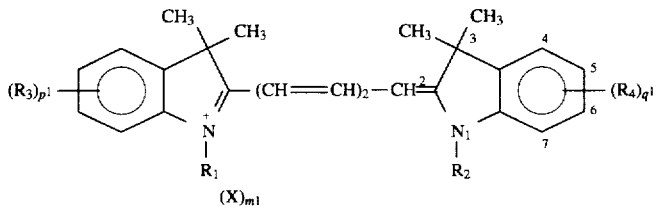

In formula (4), each of $R_1$ and $R_2$ is a hydrocarbon group, especially an alkyl group. The alkyl groups may be either substituted or unsubstituted. Preferred are alkyl groups having 1 to 10 carbon atoms, such as methyl, ethyl, propyl, butyl, pentyl, and hexyl groups. Substituents on the alkyl groups include halogen, alkyl, aryl, alkoxy, amino, heterocyclic, carboxylate and sulfonate groups. $R_1$ and $R_2$ may be identical or different. More preferably $R_1$ and $R_2$ are unsubstituted alkyl groups.

Each of $R_3$ and $R_4$ is a monovalent group, for example, substituted or unsubstituted alkyl, aryl, alkoxy, amino and heterocyclic groups and halogen atoms. If possible, these monovalent groups may have a substituent which is the same as exemplified for $R_1$ and $R_2$.

Letters p1 and q1 each are 0 or an integer of 1 to 4. Where each of p1 and q1 is an integer of 2 to 4, adjoining $R_3$ groups or adjoining $R_4$ groups, taken together, may form a ring which is preferably carbocyclic, especially a benzene ring.

X is a counter anion. Letter m1 is a number necessary to neutralize an electric charge, which depends on the type of $R_1$ to $R_4$. For example, m1 is equal to 0 when an inner salt is formed as given by the combination that $R_1$ is a carboxylate or sulfonate-substituted alkyl group and $R_2$, $R_3$, and $R_4$ are electrically neutral groups.

Preferred among the indolenine-cyanine dyes of formula (4) are the following combinations of $R_1$ to $R_4$, p1 and q1.

(1) $R_1$, $R_2$: unsubstituted alkyl groups having 1 to 6 carbon atoms, e.g., methyl, ethyl, propyl, butyl, pentyl and hexyl groups.

(2) $R_3$, $R_4$, p1, q1:

(2-1) One of p1 and q1 is 0 or 1 and the other is 2. When p1 or q1 is 2, adjoining $R_3$ groups or adjoining $R_4$ groups, taken together, form a benzene ring (the benzene ring is preferably condensed at 4- and 5-positions).

(2-2) Both p1 and q1 are 0.

(2-3) Both p1 and q1 are 2 and adjoining $R_3$ groups or adjoining $R_4$ groups, taken together, form a benzene ring (the benzene ring is preferably condensed at 4- and 5-positions).

More preferred among the indolenine-cyanine dyes of formula (4) are those of the following general formula (5).

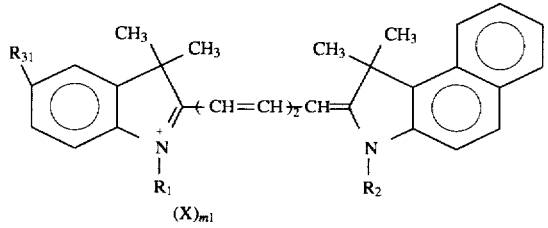

In formula (5), $R_1$, $R_2$, X and m1 are as defined for formula (4). $R_{31}$ is a hydrogen atom, halogen atom or alkyl group. Chlorine is a typical halogen atom. Preferred examples of the alkyl group are unsubstituted alkyl groups having 1 to 4 carbon atoms such as methyl, ethyl, propyl and butyl groups. Preferably $R_{31}$ is hydrogen, chlorine or methyl.

The counter anion X in formulae (4) and (5) is selected from conventional acid anions and metal complex quencher anions, with the latter being preferred.

Examples of the metal complex quencher anions include those of acetylacetonato systems, bisdithiol systems such as bisdithio-α-diketone and bisphenylenedithiol systems, thiocatechol systems, salicylaldehydeoxime systems, and thiobisphenolate systems. Preferred among others are metal complex quencher anions of the bisphenylenedithiol system, which are desirably represented by the following general formula (6).

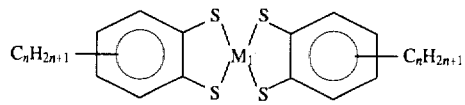

In formula (6), $M_1$ is a center metal, for example, Ni, Cu, Co, Pd, and Pt, with Ni and Cu being preferred. Letter n is an integer of 1 to 10, especially 4.

Examples of the acid anion include halide ions (e.g., $Cl^-$, $Br^-$ and $I^-$), $ClO_4^-$, $BF_4^-$, $PF_6^-$, $VO_3^-$, $VO_4^{3-}$, $WO_4^{2-}$, $CH_3SO_3^-$, $CF_3COO^-$, $CH_3COO^-$, $HSO_4^-$, $CF_3SO_3^-$, $PO_4.12WO_3^{3-}$, p-toluenesulfonate ion (PTS$^-$), and p-trifluoromethylphenylsulfonate ion (PFS$^-$).

Specific examples of the indolenine-cyanine dye of formula (5) are shown in Table 2 as combinations of $R_1$, $R_2$, $R_{31}$, X and m1.

TABLE 2

| Compound No. | $R_1$ | $R_2$ | $R_{31}$ | X | m1 |
|---|---|---|---|---|---|
| 5-1 | $C_3H_7$ | $C_4H_9$ | H | Q | 1 |
| 5-2 | $C_3H_7$ | $C_4H_9$ | $CH_3$ | Q | 1 |
| 5-3 | $C_3H_7$ | $C_4H_9$ | Cl | Q | 1 |

(Q is a quencher anion of formula (6) wherein $M_1$ is a metal atom such as Ni and Cu and n is 4.)

Another preferred example of dye B is a phthalocyanine dye (other than dye A) which is desirably of the following general formula (7).

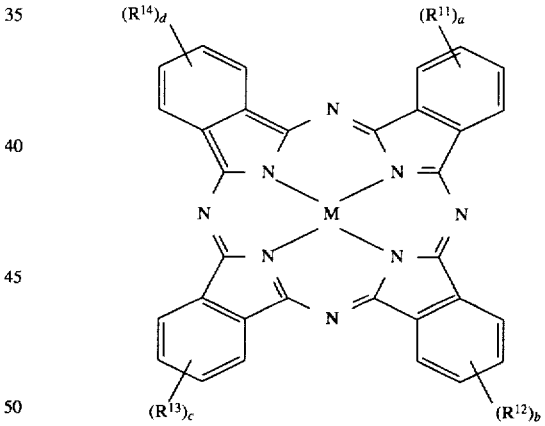

In formula (7), M is a center atom, for example, hydrogen and metal atoms as exemplified in formula (1). Preferred examples of the metal atom include Cu, Si, Ni, Co, Pd, and Zr, with Pd being most preferred.

Each of $R^{11}$, $R^{12}$, $R^{13}$ and $R^{14}$ is a monovalent substituent group. Each of letters a, b, c and d is 0 or an integer of 1 to 4, preferably 1 or 2. Examples of the monovalent group represented by $R^{11}$ to $R^{14}$ include sulfamoyl, nitro, azo and alkyl groups. Among these, branched alkyl groups having 3 to 10 carbon atoms are preferred, with unsubstituted ones being especially preferred. $R^{11}$ to $R^{14}$ may be identical or different although they are generally identical.

Specific examples of the second phthalocyanine dye of formula (7) are shown in Table 3 as combinations of M, $R^{11}$ to $R^{14}$, and a to d.

TABLE 3

| Compound No. | M | $R^{11}$ (= $R^{12}$ = $R^{13}$ = $R^{14}$) | a (= b = c = d) |
|---|---|---|---|
| 7-1 | Pd | —CHCH$_2$CH(CH$_3$)$_2$<br>\|<br>CH$_3$ | 1 |
| 7-2 | Pd | —CH$_2$CHC$_4$H$_9$<br>\|<br>C$_2$H$_5$ | 1 |
| 7-3 | Pd | —CHCH(CH$_3$)$_2$<br>\|<br>CH$_3$ | 1 |
| 7-4 | Pd | —CHCH(CH$_3$)$_2$<br>\|<br>CH$_2$CH(CH$_3$)$_2$ | 1 |
| 7-5 | Pd | —CH(CH(CH$_3$)$_2$)$_2$ | 1 |

A further preferred example of dye B is a metal complex dye which is desirably selected from dithiol metal complexes, indoaniline metal complexes, and azomethine chelate complexes having Ni as a center metal.

The optical recording disk of the invention has a dye base recording layer and a reflective layer in close contact therewith and is capable of reproduction in accordance with the CD standard.

Referring to FIG. 1, there is schematically illustrated an optical recording disk according to one embodiment of the invention. The optical recording disk 1 includes a substrate 2 having front and rear surfaces (upper and lower surfaces in the FIGURE) and a groove 23 in the front surface. The optical recording disk 1 is shown in FIG. 1 as comprising a dye base recording layer 3 on the front surface of the grooved substrate 2, a reflective layer 4 disposed on the surface of the recording layer 3 in close contact, and a protective layer 5 disposed on the surface of the reflective layer 4. Recording and reproducing light is directed to the recording layer 3 within the groove 23 from the rear surface side of the substrate 2.

The substrate 2 is of conventional disk shape and has commonly used dimensions, for example, a thickness of about 1.2 mm and a diameter of about 80 to 120 mm when the disk is intended for a recordable CD. The substrate 2 is formed of a resin or glass material which is substantially transparent to recording and reading light, typically a semiconductor laser beam having a wavelength of 600 to 900 nm, especially 770 to 800 nm, most often 780 nm. The substrate material preferably has a transmittance of at least 88% so that recording and reading operation can be made through the substrate 2, that is, from the rear surface of the substrate 2 remote from the recording layer 3. Preferably, the substrate 2 is formed of resins, typically thermoplastic resins such as polycarbonate resin, acrylic resins, amorphous polyolefins, and TPX using conventional techniques such as injection molding.

On the surface of the substrate 2 where the recording layer 3 is formed, the upper surface in the illustrated embodiment, a groove 23 is formed for tracking purposes. The tracking groove 23 is preferably a continuous spiral groove wherein adjoining groove turns are separated by a land 21. Typically, the groove has a depth of 800 to 1,700 Å, more preferably 1,000 to 1,500 Å (depth is a distance from the land 21 to the groove 23 bottom) and a width of 0.3 to 0.6 μm, more preferably 0.4 to 0.5 μm (width is a distance in a radial direction with respect to the disk center). The adjoining groove turns are preferably arranged at a pitch of 1.5 to 1.7 μm. The groove is preferably formed at the same time as molding of the substrate 2. Alternatively, a resin layer (not shown) having a predetermined pattern including grooves may be formed on the substrate by 2P (photo-polymerization) method or the like.

Where the groove is formed in the substrate 2 surface, a provision is preferably made such that recording light may be directed to a recording layer within the groove 23. That is, the optical recording disk of the invention is preferably used as an optical recording medium of the groove recording type. The groove recording permits the recording layer to have a greater effective thickness.

The groove having the above-defined depth and width ensures improved writing and reading properties. Ease of processing is another advantage. A groove depth greater than the above-defined range would result in lower reflectivity. A groove depth less than the above-defined range would result in a lower recording sensitivity and a lower radial contrast before recording. A groove width greater than the above-defined range would result in increased crosstalk, that is, interference between radially adjoining pits, more frequent occurrence of record signal waveform distortion, more jitter and more errors. A groove with a width less than the above-defined range is difficult to process.

The recording layer 3 is formed on the grooved substrate 2 using a mixture of the first and second dyes A and B. For CD signal recording, the recording layer 3 preferably has a coefficient of extinction (the imaginary part of a complex index of refraction) k of from 0.02 to 0.05 at the wavelength of recording and reading light. With k<0.02, the recording layer can have a lower absorptivity so that it might become difficult to record with a commonly used power. A coefficient of extinction k of more than 0.05 can result in a drop of reflectivity to below 70%, often failing to reproduce according to the CD standard. The recording layer preferably has an index of refraction (the real part of a complex index of refraction) n of from 2.0 to 2.6 at the wavelength of recording and reading light. With n<2.0, the reflectivity and signal outputs would be reduced, often failing to read by CD players. Few dyes have n>2.6.

In determining n and k of a recording layer, a sample is prepared by forming a recording layer on a given transparent substrate to a thickness of about 40 to 100 nm under practical conditions. Then the reflectivity of the sample is measured through the substrate or from the recording layer side. Reflectivity is measured in a specular reflection mode (of the order of 5°) using light having the recording/reproducing wavelength. The transmittance of the sample is also measured. The index of refraction n and coefficient of extinction k may be calculated from these measurements according to Ishiguro Kozo, "Optics," Kyoritsu Publishing K.K., pages 168–178. Also n and k of a dye are determined by forming a dye film and measuring the parameters of the dye film as above.

In the present invention, that region of the recording layer 3 within the groove 23 becomes a recording track. The (tracking) region of the recording layer 3 within the groove 23 preferably has a thickness of 1,000 to 3,000 Å, more preferably 1,500 to 2,500 Å. Within this thickness range, a sufficient degree of modulation is expectable. If the recording layer is too thin within the groove, there would be available a lower degree of modulation. That region of the recording layer 3 above the land 21 (between the grooves 23) has a thickness of about 800 to 1,700 Å, especially 1,000 to 1,500 Å. On average, the recording layer 3 has a thickness of about 1,250 to 2,000 Å.

When the thickness of the recording layer 3 on the groove and land is controlled within the above-defined range, reflectivity is enhanced to ensure reproduction in accordance with the CD standard. If the recording layer 3 is thinner, reflectivity is reduced to make it difficult to ensure reproduction in accordance with the CD standard.

The recording layer 3 may be formed by any desired process. Coating is recommended because greater margins are afforded with respect to a choice of dyes, medium design, a degree of freedom during manufacture, and ease of manufacture. For coating of the recording layer 3, various solvents may be used including ketone, ester, ether, aromatic, halogenated alkyl, alcohol, and cellosolve solvents. Spin coating is a preferred coating technique.

The reflective layer 4 is formed directly on the recording layer 3 in close contact therewith. The reflective layer 4 may be constructed by a high reflectivity metal or alloy such as Au, Ag, Cu or alloys thereof. It preferably has a thickness of at least 500 Å and may be formed by evaporation or sputtering. The upper limit of thickness is not critical although it is about 1,200 Å or less when cost and production time are taken into account.

The reflective layer alone has a reflectivity of at least 90%, and the reflectivity of an unrecorded portion of an optical recording disk through the substrate can be at least 60%, especially at least 70%. Such high reflectivity enables reproduction in accordance with the CD standard. Reading light may have a power of about 0.1 to 1.0 mW.

Preferably the protective film 5 is formed on the reflective layer 4. For example, the protective film 5 is formed of various resins such as UV-curable resins to a thickness of about 0.5 to 30 μm, especially about 1 to 10 μm. The protective film 5 may be a layer to be deposited or a preformed sheet to be applied onto the reflective layer 4. Preferably the protective film 5 is formed by coating a composition containing a radiation-curable compound and a photopolymerization sensitizer and curing the coating with radiation. It preferably has a hardness of H to 8H, especially 2H to 7H according to the pencil hardness scale at 25° C. (JIS K-5400).

Recording or additional recording may be carried out on the optical recording disk 1 of the above-described construction by directing recording light having a wavelength of 780 nm, for example, in pulse form to the recording layer 3 in the groove 23 through the substrate 2 to form an irradiated or recorded spot whose optical reflectivity has changed. The recording layer 3 absorbs light so that it is heated while the substrate 2 is heated at the same time. As a result, the recording material, typically dyes melts or decomposes near the interface between the substrate 2 and the recording layer 3, probably applying a pressure to the interface to deform the bottom and side walls of the groove 23. On recording, the disk is rotated at a linear velocity of about 1.2 to 1.4 m/s.

EXAMPLE

Examples of the present invention are given below by way of illustration and not by way of limitation.

Example 1

An optical recording disk sample as shown in FIG. 1 was prepared by injection molding a polycarbonate resin into a substrate having a diameter of 120 mm and a thickness of 1.2 mm. The substrate included in its recording layer-bearing surface a continuous spiral tracking groove having a pitch of 1.6 μm, a width of 0.42 μm and a depth of 1,550 Å. On the resin substrate, a mixture of a phthalocyanine dye A and an indolenine-cyanine dye B was spin coated to form a recording layer. The phthalocyanine dye A used herein was compound No. 3-1 of formula (3) shown in Table 1 and the indolenine-cyanine dye B used herein was compound No. 4-1 of formula (4) shown in Table 2. They were mixed in a weight ratio as shown in Table 4. For spin coating, a diacetone alcohol solution containing 7% by weight of the dyes combined was used. The recording layer had a thickness of 2,400 Å on the groove and 1,400 Å on the land. With respect to refractive index and extinction coefficient, dye A had n=2.3 and k=0.04 and dye B had n=2.3 and k=0.03. These parameters were determined as previously described by forming a dye film of 900 to 1000 Å thick on a polycarbonate substrate and measuring reflectivity and transmittance at a wavelength of 780 nm.

On the recording layer, gold was deposited to form a reflective layer of 1,000 Å thick. A UV-curable acrylic resin was coated onto the reflective film and cured to form a protective film of 5 μm thick. A series of optical recording disks were completed in this way.

CD signals were recorded in the optical recording disks at a wavelength of 780 nm to determine the optimum recording power. On recording, the disk was rotated at a linear velocity of 1.4 m/s.

The recording layer was measured for heat decomposition temperature (Td) by thermogravimetric analysis. More particularly, the heat decomposition temperature was measured by mixing dye crystals in a ratio corresponding to the dye composition of the recording layer, forming a sample of uniform distribution, and heating the sample in an argon atmosphere so as to avoid any influence of oxygen. Dyes A and B were independently measured for Td by thermogravimetric analysis. Dyes A and B had a Td of 419.7° C. and 260.2° C., respectively. The results are shown in Table 4.

TABLE 4

| Sample | Recording layer | | | Optimum recording |
|---|---|---|---|---|
| No. | Dye A/B | Td (°C.) | k | power (mW) |
| 1* | 100/0 | 419.7 | 0.040 | 9.0 |
| 2 | 75/25 | 247.2 | 0.038 | 7.0 |
| 3 | 65/35 | 247.2 | 0.037 | 6.5 |
| 4 | 50/50 | 245.2 | 0.035 | 6.0 |
| 5 | 35/65 | 246.3 | 0.034 | 6.0 |
| 6 | 25/75 | 249.6 | 0.032 | 6.5 |
| 7* | 0/100 | 260.2 | 0.030 | 6.5 weak to light |

*outside the scope of the invention

The advantages of the invention including a depression of heat decomposition temperature are evident from the data of Table 4.

For sample Nos. 2 to 7, bare samples prior to deposition of the reflective layer were tested for light resistance by determining a dye retentivity. The percent dye retentivity was determined by measuring an initial transmittance $T_0$ of a recording layer-coated sample, exposing the sample to a xenon lamp at 80,000 lux for 40 hours, measuring a transmittance T of the exposed sample, and calculating in accordance with $(100-T)/(100-T_0) \times 100\%$. A dye retentivity of 90% or more was regarded acceptable with respect to light resistance. Sample Nos. 2 to 6 were acceptable whereas sample No. 7 was unacceptable with respect to light resistance.

Additionally, sample Nos. 2 to 6 were measured for reflectivity at 780 nm. They all had a reflectivity of higher than 65% which is sufficient to enable reading in accordance with the CD standard.

Additional samples were prepared by combining a compound in Table 1 with a compound in Table 2 such that a mixture might have a depression of Td in accordance with the present invention. In these samples, results similar to Table 4 were obtained in proportion to the weight ratio of dye A/dye B.

Example 2

Sample No. 24 was prepared by the same procedure as sample No. 4 of Example 1 except that a phthalocyanine dye No. 6-1 in Table 3 (Td=280° C., n=2.0, k=0.03) was used as dye B. The recording layer of this sample had a Td of 290° C., k=0.035, and an optimum recording power of 6.5 mW.

Additional samples were prepared by combining a compound in Table 1 with a compound in Table 3 such that a mixture might have a depression of Td in accordance with the present invention. In these samples, similar acceptable results were obtained.

Example 3

Sample No. 34 was prepared by the same procedure as sample No. 4 of Example 1 except that a metal complex dye in the form of azomethine chelate complex having a center metal Ni (Td=135° C., n=1.90, k=0.02) was used as dye B. For the preparation of this sample, dye A and dye B (metal complex dye) were mixed in a weight ratio of 80:20 and dissolved in a fluorinated alcohol to form a coating solution. The recording layer of this sample had a Td of 250° C., k=0.036, and an optimum recording power of 6.5 mW.

Sample Nos. 35 and 36 were similarly prepared except that the weight ratio of dye A/B was 50/50 and 0/100.

The results are shown in Table 5.

TABLE 5

| Sample No. | Recording layer | | | Optimum recording power (mW) |
|---|---|---|---|---|
| | Dye A/B | Td (°C.) | k | |
| 1* | 100/0 | 419.7 | 0.040 | 9.0 |
| 34 | 80/20 | 250.0 | 0.036 | 6.5 |
| 35 | 50/50 | 220.0 | 0.030 | 7.0 |
| 36* | 0/100 | 135.0 | 0.020 | 8.0 |

*outside the scope of the invention

There has been described an optical recording disk having a recording layer consisting essentially of a phthalocyanine dye A having a heat decomposition temperature $Td_1$ and a second dye B having a heat decomposition temperature $Td_2$ wherein $Td_1 > Td_2$. The recording layer is improved in recording sensitivity while maintaining the stability or light resistance inherent to the phthalocyanine dye A.

Japanese Patent Application No. 87864/1994 is incorporated herein by reference as well as the above-cited patent publications.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical recording disk comprising a substrate having a groove for tracking, a dye-containing recording layer on the substrate, and a reflective layer on the recording layer, wherein recording light is directed to the recording layer in the groove to form a recorded spot, said recording layer containing at least one phthalocyanine dye and at least one second dye having a lower heat decomposition temperature than said phthalocyanine dye.

2. The optical recording disk of claim 1 wherein said second dye is selected from the group consisting of a phthalocyanine dye, an indolenine-cyanine dye, and a metal complex dye.

3. The optical recording disk of claim 2 wherein said second dye is an indolenine-cyanine dye.

4. The optical recording disk of claim 1 wherein said phthalocyanine dye and said second dye are present in a weight ratio of from 85:15 to 25:75.

5. The optical recording disk of claim 1 wherein said groove has a depth of 800 to 1,700 Å and a width of 0.3 to 0.6 μm.

6. The optical recording disk of claim 1 wherein said recording layer in said groove has a thickness of 1,500 to 2,500 Å.

* * * * *